(12) United States Patent
Chapman et al.

(10) Patent No.: US 6,594,774 B1
(45) Date of Patent: Jul. 15, 2003

(54) METHOD AND APPARATUS FOR MONITORING COMPUTER SYSTEM OBJECTS TO IMPROVE SYSTEM RELIABILITY

(75) Inventors: Craig Chapman, Redmond, WA (US); Mark M. Moeller, Bellingham, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/390,941

(22) Filed: Sep. 7, 1999

(51) Int. Cl.⁷ .................................................. G06F 11/00
(52) U.S. Cl. ........................ 714/2; 714/38; 714/48; 714/25
(58) Field of Search ..................... 714/15, 48, 50, 714/21, 2, 38, 26

(56) References Cited

U.S. PATENT DOCUMENTS

| | | | | |
|---|---|---|---|---|
| 4,072,852 A | * | 2/1978 | Hogan et al. ............... 713/601 |
| 4,318,173 A | * | 3/1982 | Freedman et al. .......... 709/103 |
| 4,512,019 A | * | 4/1985 | Bodig et al. ................ 701/114 |
| 4,587,655 A | * | 5/1986 | Hirao et al. ................ 701/114 |
| 4,785,417 A | * | 11/1988 | Obrea ......................... 705/410 |
| 5,269,017 A | * | 12/1993 | Hayden et al. .............. 714/15 |
| 5,297,150 A | * | 3/1994 | Clark .......................... 706/922 |
| 5,305,455 A | * | 4/1994 | Anschuetz et al. ......... 709/100 |
| 5,355,469 A | * | 10/1994 | Sparks et al. ............... 714/38 |
| 5,355,483 A | * | 10/1994 | Serlet .......................... 711/154 |
| 5,392,432 A | * | 2/1995 | Engelstad et al. ...... 707/103 R |
| 5,412,802 A | * | 5/1995 | Fujinami et al. ............ 706/48 |
| 5,526,485 A | * | 6/1996 | Brodsky ...................... 714/38 |
| 5,628,016 A | * | 5/1997 | Kukol .......................... 717/114 |
| 5,671,351 A | * | 9/1997 | Wild et al. .................. 714/38 |
| 5,689,707 A | * | 11/1997 | Donnelly ..................... 707/205 |
| 5,715,386 A | * | 2/1998 | Fulton, III et al. ........... 714/15 |
| 5,748,882 A | * | 5/1998 | Huang ......................... 709/224 |
| 5,758,065 A | * | 5/1998 | Reams et al. ................ 714/43 |
| 5,828,830 A | * | 10/1998 | Rangaraian et al. ........... 707/7 |
| 5,832,283 A | | 11/1998 | Chou et al. ............. 395/750.01 |
| 5,832,514 A | * | 11/1998 | Norin et al. ................. 707/10 |
| 5,902,352 A | | 5/1999 | Chou et al. ................ 709/102 |
| 5,944,839 A | * | 8/1999 | Isenberg ...................... 706/47 |
| 6,016,500 A | * | 1/2000 | Waldo et al. ................ 707/10 |
| 6,065,123 A | | 5/2000 | Chou et al. ................ 713/322 |
| 6,098,166 A | * | 8/2000 | Leibholz et al. ............ 712/215 |
| 6,131,170 A | * | 10/2000 | Oishi et al. ................. 709/207 |
| 6,134,601 A | * | 10/2000 | Spilo et al. ................. 709/328 |
| 6,173,421 B1 | * | 1/2001 | Weaver Johnson et al. ... 714/38 |
| 6,178,529 B1 | * | 1/2001 | Short et al. ................. 709/223 |
| 6,279,121 B1 | * | 8/2001 | Gamo ........................... 48/10 |
| 6,330,709 B1 | * | 12/2001 | Johnson et al. ............ 717/100 |
| 6,334,193 B1 | * | 12/2001 | Buzsaki ........................ 714/2 |

OTHER PUBLICATIONS

Naughton et al., Java 1.1: The Complete Reference, Second Edition, 1998, Osborne/McGraw–Hill, ch. 10: Exception–Handling Fundamentals.*

"Dynamic Memory Allocation for Multiple Concurrent Sorts", IBM Technical Disclosure Bulletin, Dec. 1993, US, vol. 36, iss 12, pp. 369–370.*

* cited by examiner

Primary Examiner—Robert Beausoliel
Assistant Examiner—Gabriel L. Chu
(74) Attorney, Agent, or Firm—Lee & Hayes, PLLC (57) ABSTRACT

Computer system reliability is improved using various techniques to monitor objects (e.g., processes, threads, DLLs, etc.) executing on the system. Such techniques include active techniques, in which information is continually communicated from the object to the monitor, and passive techniques, in which the object does not need to repeatedly provide information to the monitor. The monitor determines when an object in the computer system has failed, and initiates appropriate recovery action when such a failure is detected.

63 Claims, 7 Drawing Sheets

METHOD AND APPARATUS FOR MONITORING COMPUTER SYSTEM OBJECTS TO IMPROVE SYSTEM RELIABILITY

TECHNICAL FIELD

This invention relates to reliable computer systems, and more particularly to monitoring computer system objects to improve system reliability.

BACKGROUND OF THE INVENTION

Computer technology is continually advancing, continually providing new and expanded uses for computers. As such uses continue to grow and expand, the importance of computers and people's reliance on their continued operation similarly grows. Currently, typical computer systems are "mostly reliable". That is, most of the time computer systems operate as they are intended to. However, occasionally a computer system will "crash"—an application terminates abnormally, the entire computer system "freezes up" and will not respond to user input, etc. Such system crashes are typically resolved by the user either restarting the application that terminated abnormally, or alternatively by rebooting the entire system. While such system crashes can be annoying, the fact that the system is operating correctly most of the time is usually adequate for most computer systems, such as desktop computer systems.

However, in some settings or situations users expect a higher degree of system reliability, such that "mostly reliable" is insufficient. An example of such a system is a "vehicle computer", which provides more conventional "desktop computer" functionality to vehicle operators and occupants. Vehicle operators typically expect the same level of reliability from vehicle computers as they do from the other electronic systems in their vehicles (e.g., audio systems), which is virtually 100% reliability. However, typical computer systems are not able to provide such higher levels of reliability.

An additional problem that computer systems can face is that of diagnostics. In some settings (e.g., in vehicles) it is very difficult to diagnose system problems at the time the problem occurs because there are no diagnostic or debugging connections to the system. Without the ability to diagnose problems with the system when the problems occur, it is more difficult (e.g., for designers and service technicians) to determine what caused the problems and how to avoid them in the future.

The invention described below addresses these disadvantages, providing an improved way to monitor computer system objects to improve system reliability.

SUMMARY OF THE INVENTION

The invention concerns a computer system executing multiple objects (e.g., processes, threads, DLLs, etc.). The invention provides a way to improve the overall reliability of the computer system by carrying out various monitoring functions and taking various actions when problems are detected.

According to one aspect of the invention, objects can register with a critical process monitor for various types of monitoring. As part of the registration process the object provides the type of monitoring it would like the monitor to perform in order to detect a failure of the object. The object also provides a recovery action that should be taken in the event the monitor detects a failure of the object. Additionally, a callback function can be provided that is used by the monitor to inform the object that recovery is about to occur and give the object a chance to decline the recovery action. One such type of monitoring is a "notification" type, in which the object continues to send notification messages to the monitor within a specified time interval. If the monitor does not receive a notification message within the specified time interval, then it determines that the object has failed. Another type of monitoring is a "watch" type, in which the monitor repeatedly checks whether the object is still executing. If the monitor detects that the object is no longer executing, then it determines that the object has failed.

According to another aspect of the invention, the monitor uses a "test" thread to help verify that an object has failed. If the monitor determines that the object has failed because it is not receiving notification messages within the specified time interval, the monitor checks how frequently a test thread of the monitor is being scheduled. If the test thread is not being scheduled, then the monitor assumes that the object has not failed, but rather that another process or thread is consuming a significant amount of processor time and is preventing other objects from being scheduled.

According to another aspect of the invention, a watchdog logic is included in the computer system. The watchdog logic is programmed to reboot the computer if it is not accessed regularly. The critical process monitor refreshes the watchdog logic regularly to avoid having the computer system rebooted. However, if a system problem prevents the critical process monitor from running, then the watchdog logic reboots the computer system.

According to another aspect of the invention, memory heap size for each process is monitored by the critical process monitor. If the heap of a process grows beyond a threshold size, then the monitor logs the event for subsequent diagnostic use.

According to another aspect of the invention, an Application Programming Interface (API) provides the interface between the monitor and the objects in the computer system, allowing the objects to access the various features of the monitor.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

In the discussion herein, the invention is described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

The invention provides a monitoring function to monitor objects in the computer system during system operation. The invention uses various techniques to detect when an object has failed and initiate appropriate recovery action. A variety of different methodologies can be used, individually or in combination, to detect when an object has failed.

System Architecture

Figure 1:
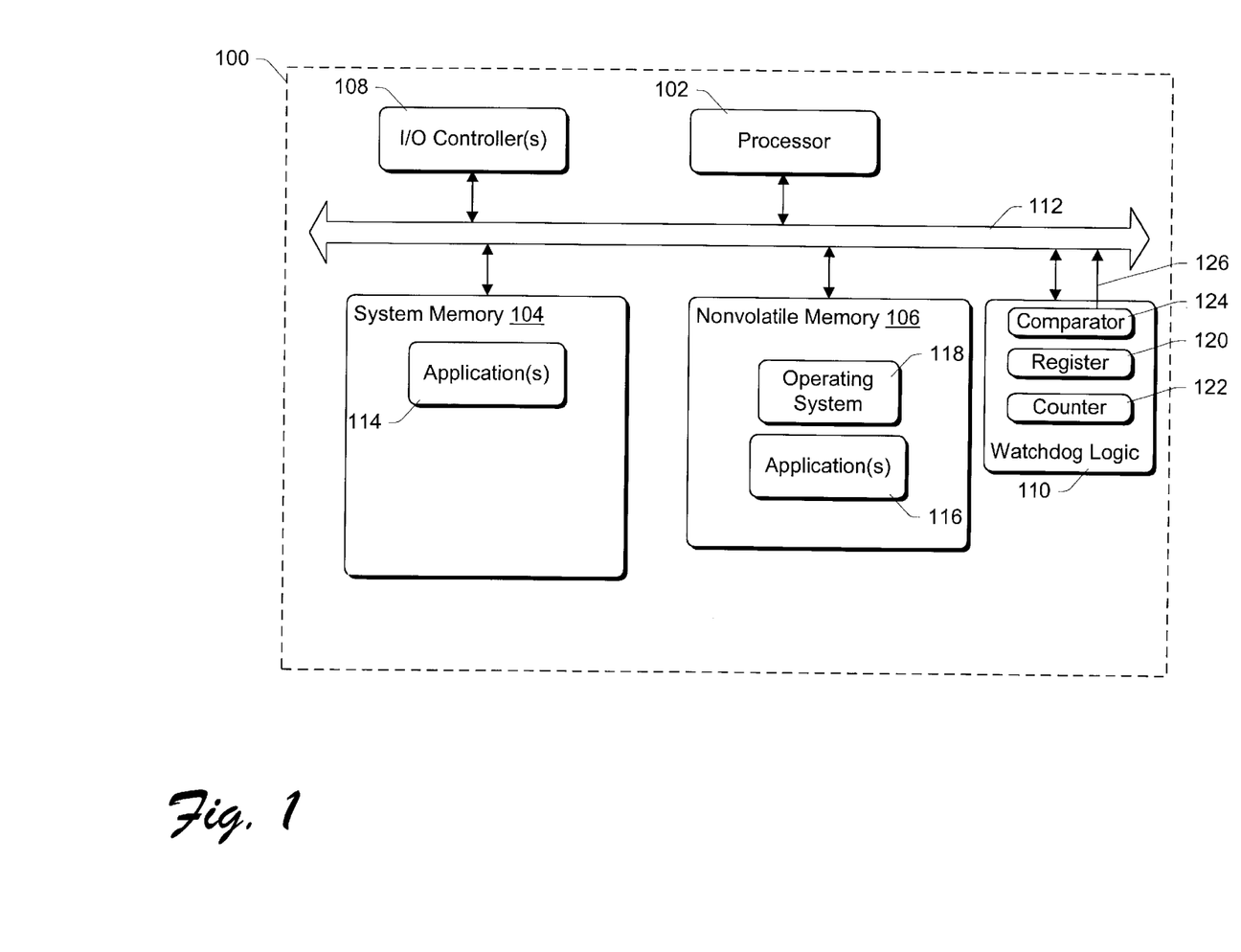
FIG. 1 illustrates an exemplary computer system used in accordance with the invention.

FIG. 1 illustrates an exemplary computer system used in accordance with the invention. The computer 100 includes a data processor(s) 102, a system memory (RAM) 104, a nonvolatile memory 106, an I/O controller 108, and a watchdog logic 110, all coupled to a system bus 112. Data processor 102 represents any of a wide variety of conventional processors, employing any of a variety of conventional processor architectures or microarchitectures.

I/O controller 108 represents one or more controllers to communicate with external devices (not shown) to provide input from the external devices to one or more components of computer 100 (e.g., processor 102), and to provide output from computer 100 to the external devices. Examples of such external devices include storage devices (e.g., magnetic or optical disks, of Flash memory devices), keypads or keyboards, display devices, touchscreens, speakers, microphones, etc. I/O controller 108 can communicate with local devices (e.g., an optical disk inserted into computer 100) or remote devices (e.g., connections via a wired or wireless network).

System memory 104 is a conventional volatile storage medium, such as dynamic random access memory (DRAM). One or more application programs 114 residing in system memory 104 can be executed by processor 102. Applications 114 can be loaded into system memory 104 from nonvolatile memory 106, or alternatively from some other local or remote external device. Portions (or all) of system memory 104 may be maintained across system boots. Thus information maintained in these "protected" portions is not lost during a re-booting process. Nonvolatile memory 106 is a conventional nonvolatile storage medium, such as Flash memory (which can be erased and reprogrammed in blocks). Processor 102 can execute instructions from application program(s) 116 or operating system 118 residing in Flash memory 106 by fetching the instructions directly from Flash memory 106 (referred to as "execute in place"), or alternatively by transferring the instructions to system memory 104 and fetching the instructions from system memory 104. Additionally, it should be noted that program instructions, at different times, may exist in various cache memories (not shown) of computer 100, such as a cache memory internal to processor 102.

Watchdog logic 110 includes a hardware register 120 that can be written to by applications being executed by processor 102. Control circuitry of watchdog logic 110 includes a counter 122 that counts down from a programmed value to zero. Each time the register 120 is written to counter 122 is reset to the programmed value. If counter 122 reaches zero, comparator 124 detects that counter 122 is at zero and asserts a reset signal 126 on the bus 112 causing the system 100 to reboot. One of applications 114 or 116 repeatedly writes to watchdog register 120 prior to counter 122 reaching zero in order to avoid having the system rebooted. However, if a system crash prevents watchdog register 120 from being written to, then comparator 124 will cause the system to reboot.

The programmed value for counter 122 is programmed by software (e.g., operating system 118) when system 100 is initialized. Alternatively, the programmed value for counter 122 may be hard-coded into logic 110 (e.g., using a ROM). Additionally, it is to be appreciated that watchdog logic 110 can be implemented in different manners, such as using a count-up rather than a count-down counter.

Figure 2:
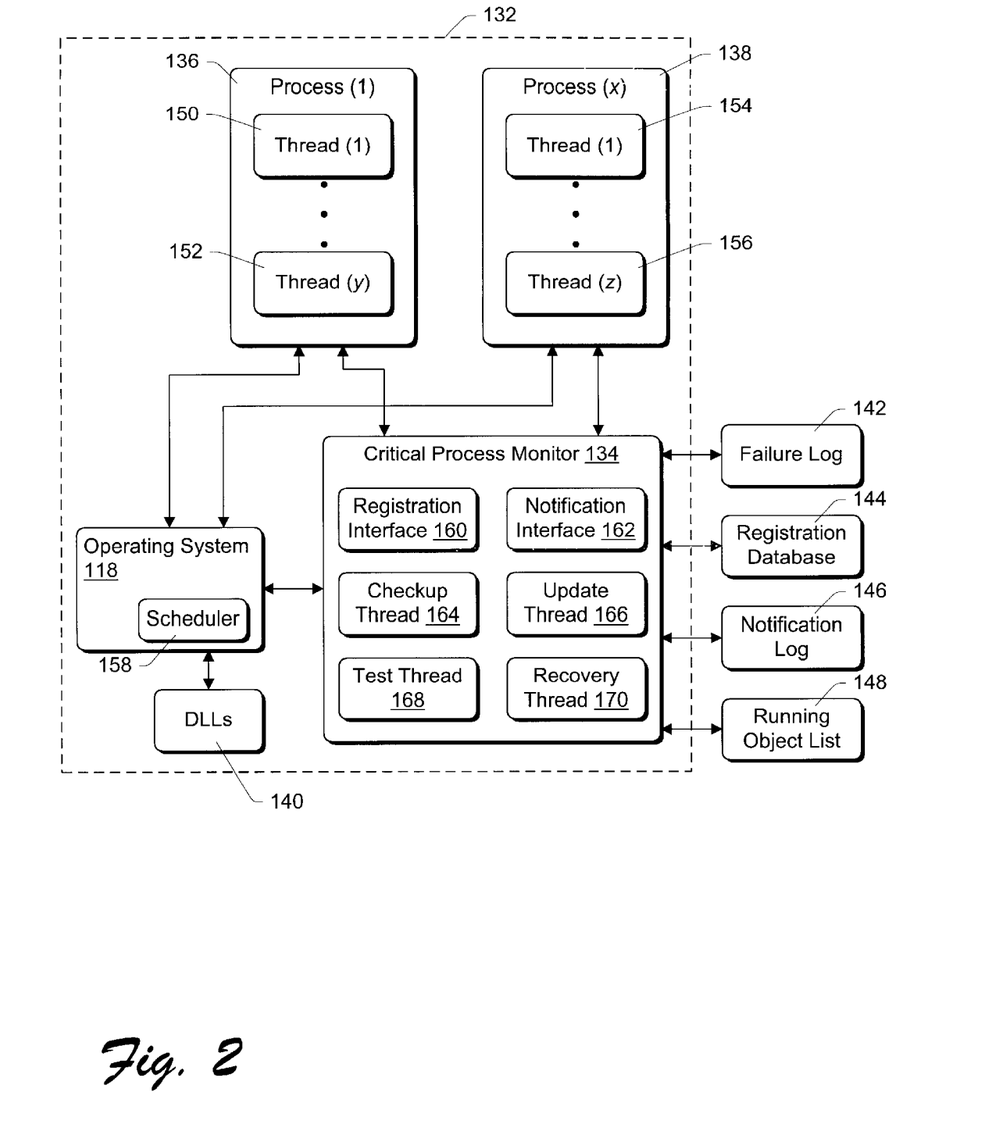
FIG. 2 illustrates an exemplary software architecture of a computer system in accordance with the invention.

FIG. 2 illustrates an exemplary software architecture of a computer system in accordance with the invention. The software architecture 132 illustrated in FIG. 2 is implemented on a computer, such as computer 100 of FIG. 1. As illustrated, the software architecture 132 includes operating system 118, a critical process monitor (CPM) 134, multiple (x) application processes 136 and 138, and one or more dynamic link libraries (DLLs) 140. Additionally, CPM 134 maintains various information in a failure log 142, a registration database 144, a notification log 146, and a running object list 148. Logs 142 and 146, database 144, and list 148 can be maintained in memory 104 and/or memory 106 of FIG. 1. In the illustrated example, failure log 142 is maintained in a portion of memory that is maintained when computer 100 is re-booted.

Operating system 118 can be any of a variety of operating systems, such as any of the "Windows" brand of operating systems (e.g., the "Windows CE" operating system) available from Microsoft Corporation of Redmond, Wash. In the illustrated example, operating system 118 is a multitasking operating system that allows simultaneous execution of multiple applications. DLLs 140 provide additional instructions that can be linked into application processes (e.g., process 136 and/or 138) at run-time rather than when the application is compiled. Operating system 118 also provides a messaging functionality that allows processes to communicate with one another by sending messages to one another.

Each executing process 136 and 138 can include one or more threads. In the illustrated example, process 136 includes multiple (y) threads 150 and 152, and process 138 includes multiple (z) threads 154 and 156. Operating system 118 includes a scheduler 158 that manages the scheduling of different threads (and/or processes) within the computer system. In scheduling the threads, scheduler 158 determines which threads will be executed by the processor 102 of FIG. 1 at particular times. This scheduling is based on multiple different factors, but is typically designed to treat threads fairly while allowing higher priority threads to be given preferential treatment over lower priority threads. Depending on the priority of a thread and the priorities of other threads that may be waiting to be executed, as well as the time required to finish execution of the thread, the thread may or may not finish execution before being temporarily suspended by scheduler 158 in order to allow another thread to execute.

Operating system 118 also allows threads to temporarily suspend their own execution (referred to as "sleeping") until a particular event occurs in the system. Threads are not scheduled by scheduler 158 when they are sleeping. When the event occurs, the thread is "awakened" and scheduled to be executed by scheduler 158. The concurrent execution of multiple processes in a computer system, each of which can include multiple threads, and allowing processes or threads to go to sleep until an event wakes them up are well-known to those skilled in the art and thus will not be discussed further except as they pertain to the invention.

CPM 134 can perform both active and passive monitoring of objects (also referred to as "client objects") in the computer system. Active monitoring of an object refers to continued communication from the object to CPM 134 (and possibly from CPM 134 to the object), while passive monitoring refers to monitoring done without continued communication from the object to CPM 134 (and possibly even without the object's knowledge).

Objects that can be monitored by CPM 134 are software entities that can be executed in the computer system. Such entities may be launched by operating system 118 or alternatively initiated by (or linked to by) an executing process. Examples of objects that can be monitored by CPM 134 include processes (e.g., processes 136 and 138), threads (e.g., threads 150–156), and DLLs (e.g., DLLs 140). Reference is also made herein to objects "corresponding to" a process. If the object is a thread the corresponding process is the parent process of the thread, and if the object is a DLL the corresponding process is the process that linked in the DLL. As used herein, if the object is a process then the process that the object corresponds to is itself.

CPM 134 includes a registration interface 160, a notification interface 162, a checkup thread 164, an update thread 166, a test thread 168, and a recovery thread 170.

Registration interface 160 provides an interface for objects to register themselves to be monitored by CPM 134. This registration informs CPM 134 of the type of monitoring CPM 134 should perform for the object, as well as what recovery action(s) CPM 134 should take in the event the object fails. Registration interface 160 also allows objects to "de-register" so that CPM 134 no longer monitors them. De-registering is particularly valuable when an object is going to terminate execution (voluntarily, without having failed)—de-registering prevents CPM 134 from believing the object has failed.

Notification interface 162 provides an interface for objects to notify CPM 134 that they are operating normally and, as far as they are concerned, have not failed. By receiving such notifications, CPM 134 can determine which objects have failed (that is, those objects which it does not receive notifications from).

Checkup thread 164 wakes up at regular or irregular intervals to check on the operational status (the "health") of the objects in the system. If any problems are detected, then checkup thread 164 wakes up recovery thread 170 to initiate the appropriate recovery action(s). Checkup thread 164 also refreshes (writes to) watchdog logic 110 of FIG. 1 each time it wakes up in order to keep the system from being rebooted. In the illustrated example, checkup thread 164 is a "time-critical" priority thread so that other threads (except for possibly other time-critical threads) cannot block it, allowing it to run to completion.

Update thread 166 wakes up at regular or irregular intervals to perform additional checks on the health of the objects in the system, providing "passive monitoring" for the system. In the illustrated example, the update thread 166 is a low-priority thread that wakes up every second to perform its checks. Alternatively, update thread 166 could wake up at different regular (or irregular) time intervals.

Update thread 166 performs two types of analysis. The first type is checking for a heap violation by any of the processes in the system. Update thread 166 determines that a heap violation occurs if the heap size for a process increases by greater than a threshold amount from it original size. If a heap violation is detected, then update thread 166 takes the appropriate recovery action. The second type of analysis is checking whether any objects that should be running in the system are no longer running. In this context, an object that "should be o running" is an object that is registered for passive monitoring (i.e., registered to be "watched", as discussed in more detail below). If an object that should be running is detected as no longer running, then update thread 166 marks the object as having failed. This marking is subsequently detected by checkup thread 164, which then wakes up recovery thread 170 to initiate the appropriate recovery action.

Recovery thread 170 is awakened whenever a failure of an object is detected by checkup thread 164. Recovery thread 170 identifies and takes the appropriate recovery action for the failed object. Recovery thread 170 may also communicate to the object that recovery of the object is about to take place. The object can then refuse recovery, causing recovery thread 170 to abort the recovery action. In the illustrated example, recovery thread 170 is a time-critical priority thread.

Test thread 168 is used to determine whether any threads of the same or higher priority as test thread 168 are being scheduled by scheduler 158. In the illustrated example, test thread 168 is a low-priority thread and all processes that register with CPM 134 should be running at least at that priority. Test thread 168 can be used by checkup thread 164 to determine if an object has not sent any notifications to CPM 134 because it has failed or because it is not being scheduled by scheduler 158. If CPM 134 detects that test thread 168 is not being scheduled, then not receiving a notification from an object does not necessarily mean that the object has failed. Rather, it most likely means that scheduler 158 has not scheduled the object so that it has not had an opportunity to provide the proper notification to CPM 134.

In the illustrated example, objects can communicate with CPM 134 via an Application Programming Interface (API). An exemplary API and its functions are described in an attached appendix that forms part of this document.

The operation of CPM 134 and its interaction with the other components of FIG. 2 is discussed in more detail below with reference to FIGS. 3–6.

Operation

Figure 3:
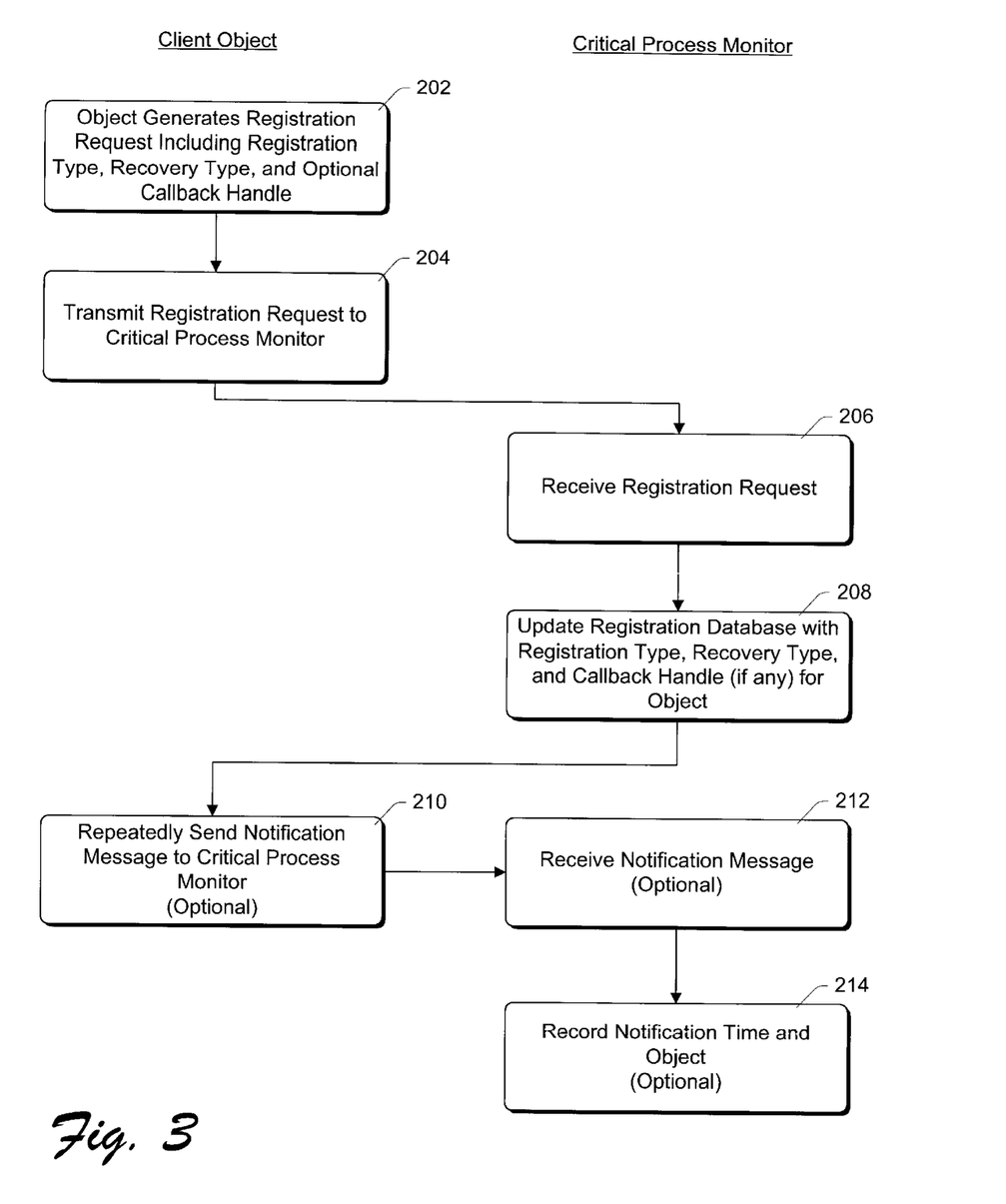
FIG. 3 is a flowchart illustrating exemplary steps for registering an object for monitoring in a computer system in accordance with the invention.

FIG. 3 is a flowchart illustrating exemplary steps for registering an object for monitoring in a computer system in accordance with the invention. The steps on the left-hand side of FIG. 3 are implemented by a client object in the system while the steps on the right-hand side of FIG. 3 are implemented by CPM 134 of FIG. 2. In the illustrated example the steps of FIG. 3 are performed in software. FIG. 3 is described with additional reference to elements in FIG. 2.

To register with CPM 134, a client object generates a registration request (step 202). The registration request includes both a registration type and a recovery type, and optionally may include a window handle to be used for the recovery callback. In the illustrated example, an object registers for one registration type, one recovery type, and optionally one callback window handle. Alternatively, an object may register for multiple registration types and multiple recovery types.

In the illustrated example, various different registration types and recovery types are supported. Exemplary registration types are indicated in Table I below, and exemplary recovery types are indicated in Table II below. It should be noted that the registration and recovery types described in Tables I and II below are only examples, and that different and/or additional registration and recovery types can be used in the invention.

TABLE I

| Registration Type | Description |
| --- | --- |
| CPM_REG_PROCESS_NOTIFY | Used by a process to indicate that the process will repeatedly send notification messages to the CPM within specified time intervals. |
| CPM_REG_PROCESS_WATCH | Used by a process to indicate that the CPM should monitor the existence of the process and initiate recovery of the process as soon as the process is no longer present. |
| CPM_REG_THREAD_NOTIFY | Used by a thread to indicate that the thread will repeatedly send notification messages to the CPM within specified time intervals. |
| CPM_REG_THREAD_WATCH | Used by a thread to indicate that the CPM should monitor the existence of the thread and initiate recovery of the thread as soon as the thread is no longer present. |

TABLE II

| Recovery Type | Description |
| --- | --- |
| CPM_RECOVER_LOG | Indicates that, when a failure of the object is detected, the failure is to be logged. No other recovery action is to be taken. |
| CPM_RECOVER_RELAUNCH | Indicates that, when a failure of the object is detected, the process corresponding to the object should be terminated (if not already terminated) and restarted. As part of the registration request, the object provides information (e.g., a command line string) to the CPM identifying how the object can be restarted. |
| CPM_RECOVER_REBOOT | Indicates that, when a failure of the object is detected, the system should be rebooted. |
| CPM_RECOVER_REBOOT_DEFERRED | Indicates that, when a failure of the object is detected, the system should be rebooted at a later time. In the illustrated example, this later time is when power to the computer system is turned off (e.g., a power off button being activated or, in the case of a vehicle computer, the vehicle's ignition being turned off). |

It should be noted that the process and thread registrations are independent of one another. Multiple threads of a process can register with CPM 134, and the process itself can register with CPM 134. It should also be noted that the process registration can be made by a thread of the process that also made a thread registration.

In the illustrated example, any thread of a process can register for the process. However, care should be taken by the process designer to have an "important" thread perform the subsequent notification. An important thread is a thread that typically needs to be operating properly in order for the corresponding process to be operating properly. Having notification performed by an important thread helps to notify CPM 134 when the process has failed. For example, if the only function of the thread performing notification were to perform the notification, then that thread could repeatedly send notification messages to CPM 134 even though other threads of the process have failed (thereby causing the process to fail to perform as it should). However, since the notification messages are being received by CPM 134, CPM 134 does not detect the process failure.

The optional callback window handle is an identifier of a window to which CPM 134 can transmit a message (e.g., using a conventional SEND message command) to allow the object to refuse recovery. Upon receipt of such a message, the object should run a procedure (or other set of instructions) that is part of the process corresponding to the client object, and should be a part of the process that is indicative of the health of the client object. For example, the procedure could be part of a main thread within the process that is necessary for proper execution of the process. Thus, if the failure of the client object were to affect that main thread of the process, then the callback procedure would most likely not operate correctly either, and thus would not be able to refuse recovery.

The manner in which the process implements the callback procedure can vary and is a design choice to be made when designing the process corresponding to the client object. By way of example, the procedure may simply respond to being called by CPM 134, with the assumption being made that if the process is operating well enough for the procedure to make a response then the process must be operating properly. By way of another example, upon being called the procedure may initiate internal diagnostic routines to verify that it has not failed.

The registration request is then transmitted to CPM 134 (step 204), which in turn receives the registration request (step 206). CPM 134 then updates the registration database 144 to include the registration and recovery types, as well as the callback handle (if any) for the object (step 208). This information, once recorded in the registration database 144, is used by CPM 134 as necessary for the subsequent monitoring and recovery of objects.

Once registered, the client object may repeatedly send notification messages to CPM 134 (step 210). Whether the client object sends notification messages to CPM 134 depends on the registration type the object provided in step 202. If the client object used a "notify" registration type (e.g., CPM_REG_PROCESS_NOTIFY or CPM_REG_THREAD_NOTIFY in Table I above), then the client will send notification messages to CPM 134 (step 210) at regular or irregular intervals (but within the time interval identified in step 202).

If the client object sends notification messages, then CPM 134 receives the notification messages (step 212). The time of the notification message and the object that sent it are then recorded by CPM 134 (step 214). In the illustrated example, the time and object are recorded in notification log 146. The recorded time for the object is subsequently used by checkup thread 164 to determine the health of the object, as discussed in more detail below.

Figure 4:
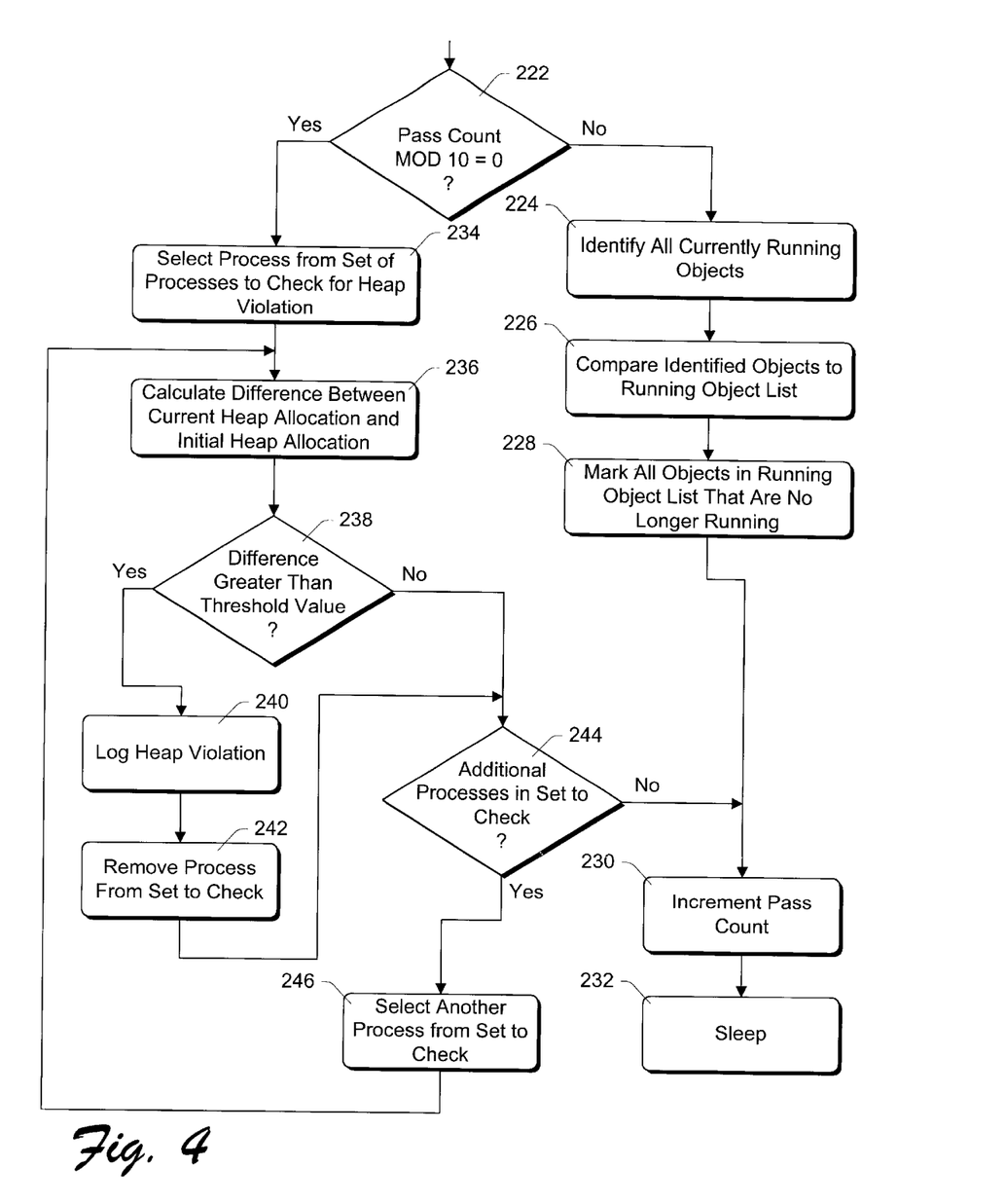
FIG. 4 is a flowchart illustrating exemplary steps of passively monitoring objects in a computer system in accordance with the invention.

FIG. 4 is a flowchart illustrating exemplary steps of passively monitoring objects in a computer system in accordance with the invention. In the illustrated example, the steps of FIG. 4 are implemented by update thread 166 of FIG. 2 and can be performed in software. FIG. 4 is described with additional reference to elements in FIGS. 2 and 3. In the illustrated example, update thread 166 is awakened and the steps of FIG. 4 are carried out every second.

Update thread 166 performs two types of passive monitoring, referred to as "heap size analysis" and "running object analysis". Every tenth time that update thread 166 is awakened it performs the heap size analysis; the other times that it is awakened it performs the running object analysis. It should be noted that the heap size analysis may be performed at other intervals rather than every tenth time. Update thread 166 maintains a record of how many times it has been awakened using a "pass count" variable. The pass count variable is initialized to the value of one when CPM 134 is executed.

Upon being executed, update thread 166 calculates the current value of the pass count variable modulus ten and determines if the resultant value is zero (step 222). If the resultant value is not zero, then the running object analysis is performed beginning with step 224.

As part of the running object analysis, all currently running objects are identified (step 224). A list of all currently running objects, including processes, threads, and DLLs can be obtained from the operating system 118. For example, if operating system 118 is the "Windows CE" operating system, a list of currently running objects can be obtained using the Process32First( ), Process32Next( ), Thread32First( ), Thread32Next( ), Module32First( ), and Module32Next( ) system calls.

The list of objects identified in step 224 is then compared to a running object list (step 226), which is a list of objects that should be running (e.g., objects that are registered) in the system. In the illustrated example, a running object list 148 of FIG. 2 is maintained by CPM 134. Objects are added to the running object list 148 by registration interface 160 when an object registers with CPM 134.

All objects that are in the running object list but are no longer running in the system are then marked (step 228). In the illustrated example, this marking comprises setting, for each object that is no longer running, a flag or similar indicator in the running object list 148 that corresponds to that object. Alternatively, a separate list of "no longer running" objects could be generated and stored by CPM 134. These marked objects will be detected by checkup thread 164 when it next wakes up, as discussed in more detail below.

Update thread 166 then increments the value of the pass count variable (step 230) and goes to sleep (step 232).

Returning to step 202, if the resultant value is not zero, then the heap size analysis is performed beginning with step 234. The heap refers to memory in the computer system that is allocated to a process by the operating system, typically in response to a request by the process. If the process is not operating properly (or is not designed properly), numerous unnecessary memory requests may be made. The heap violation analysis attempts to identify such situations.

Update thread 166 selects a process from a set of processes to check for heap violations (step 234). In the illustrated example, the set of processes to check for heap violations comprises all processes executing on the computer system. Also in the illustrated example, there is no registration process for heap violation checking. Rather, the heap violation checking is done regardless of whether a process has registered for it. Alternatively, the heap violation checking could be performed only on a set of processes that have registered for it.

Once a process is selected, update thread 166 calculates the difference between the current heap allocation and an initial heap allocation for the process (step 236). The initial heap allocation and current heap allocation are obtained by update thread 166 from operating system 118. For example, if operating system 118 is the "Windows CE" operating system, the initial heap allocation and current heap allocation can be obtained using the Heap32First( ) and Heap32Next( ) system calls. Alternatively, the initial heap allocation may be obtained and stored by update thread 166 each time update thread 166 wakes up and detects that a new process has begun executing.

Update thread 166 then checks whether the difference between the current heap allocation and the initial heap allocation is greater than a threshold value (step 238). In the illustrated example the threshold value is 200 Kbytes. Alternatively, the threshold value could be greater or smaller, or a process may register for a specific threshold value.

If the difference is greater than the threshold value, then update thread 166 logs a heap violation for the process (step 240). The logging comprises storing in failure log 142 an identifier of the process, an indication that a heap violation occurred, and the date and time when the violation occurred. Additional information may also be logged, such as the initial heap allocation of the process and the current heap allocation for the process at the time the violation occurred.

Alternatively, other recovery actions may be taken in step 240 rather than only logging the heap violation. According to one such alternative, the process registers (step 202 of FIG. 3) for a particular type of recovery to occur in the event a heap violation occurs. According to another such alternative, a message can be sent to the process (or all processes in the system) to take a particular action (e.g., terminate themselves so that they can be restarted).

The process is then removed from the set of processes to check for heap violations (step 242). The process is removed from the set of processes to check based on the assumption that subsequent checks would also indicate a heap violation, resulting in numerous entries in failure log 142 (e.g., one every ten seconds). By removing the process from the set of processes to check, the initial heap violation is recorded but numerous additional violations for the process are not recorded. Alternatively, step 242 could be skipped.

Update thread 166 then checks whether there are additional processes in the set to check (step 244). If there are additional processes to check, then update thread 166 selects one of the processes to check (step 246), and proceeds to check whether a heap violation has occurred for the process (step 236). However, if there are no additional process in the set to check, then update thread 166 increments the value of the pass count variable (step 230) and goes to sleep (step 232).

Returning to step 238, if the difference between the current heap allocation and the initial heap allocation for the process is not greater than the threshold value, then update thread 166 proceeds to step 244 to check whether there are additional processes to check for heap violations.

Figure 5:
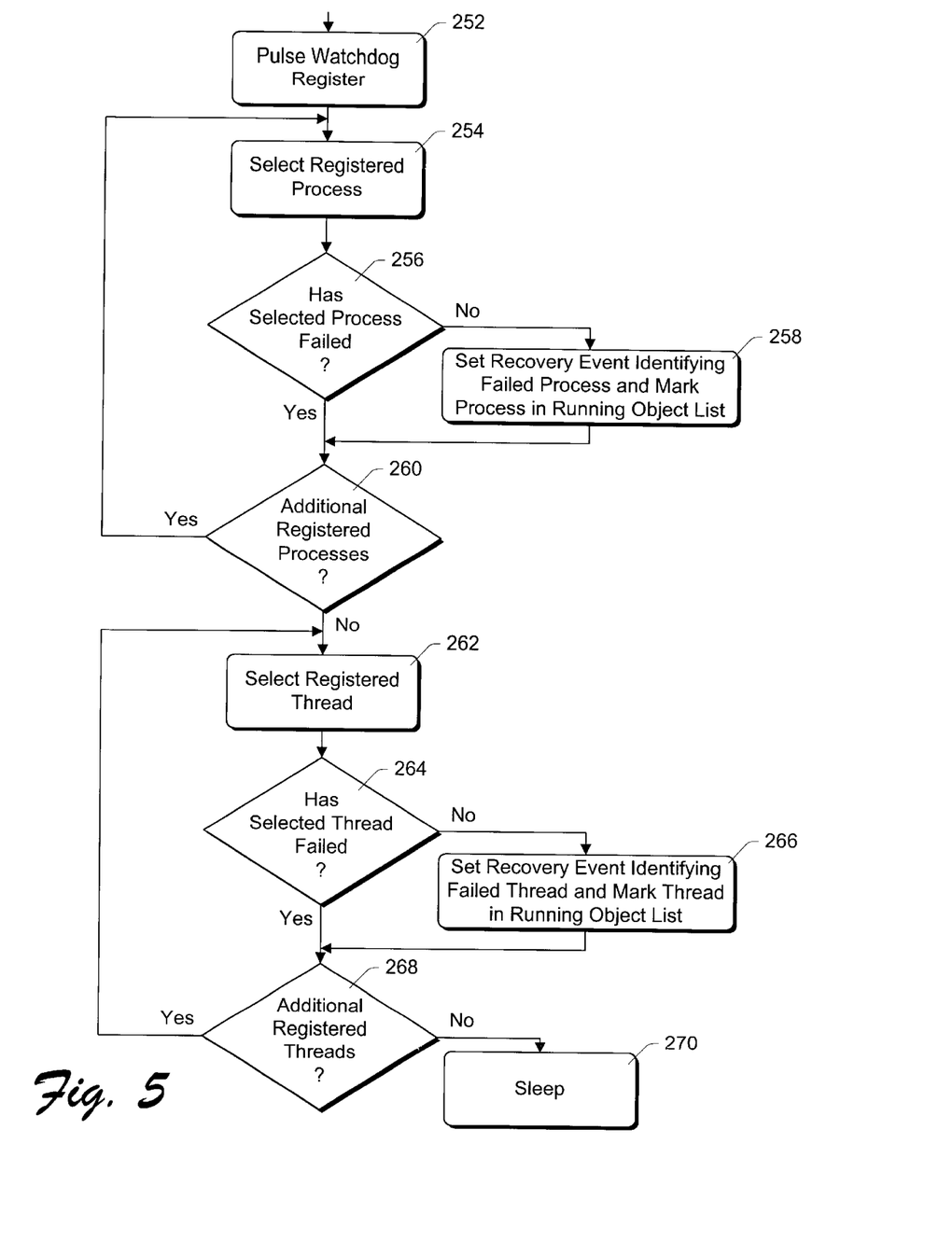
FIG. 5 is a flowchart illustrating exemplary steps of actively monitoring objects in a computer system in accordance with the invention.

FIG. 5 is a flowchart illustrating exemplary steps of actively monitoring objects in a computer system in accordance with the invention. The steps of FIG. 5 are implemented by checkup thread 164 of FIG. 2 and can be performed in software. FIG. 5 is described with additional reference to elements in FIGS. 1, 2, and 4. In the illustrated example, checkup thread 164 is awakened and the steps of FIG. 5 are carried out at regular time intervals. This time interval is equal to the lesser of the time required for counter 122 of logic 110 to count down to zero and the smallest time interval specified by any object when registering with CPM 134 (steps 202 and 204 of FIG. 3).

Upon waking up, checkup thread 164 writes to or "pulses" the watchdog register 120 of FIG. 1 (step 252) in order to prevent watchdog logic 110 from rebooting the computer system. Checkup thread 164 then iterates through the list of registered processes from registration database 144 of FIG. 2 to determine whether any have failed (steps 254–260).

In the illustrated example, checkup thread 164 uses various techniques to determine whether a process has failed. If checkup thread 164 determines that the process was marked by update thread 166 (in step 228 of FIG. 4), then the process has failed. Additionally, if the process has registered for a "notify" type of registration (e.g., CPM_REG_PROCESS_NOTIFY), and a notification message for the process has not been received within the time interval specified by the process during registration plus a "buffer" amount, then the process may have failed. In the illustrated example, checkup thread 164 increases the time interval specified by objects when they register by 20% to provide an additional temporal "buffer" to prevent an incorrect determination that the object has failed. For example, a healthy process may be delayed temporarily in sending its notification message because it is not being scheduled by scheduler 158 of FIG. 2. The additional temporal buffer helps prevent such temporary delays from being interpreted as failure of an object.

If a notification message for the process has not been received within the specified time interval plus a "buffer" amount, then test thread 168 of FIG. 2 is also used to determine whether the process has failed. The test thread is set to awaken at intervals less than the interval the checkup thread is set to awaken at (in the illustrated example, the test thread awakens at ¼ the interval at which the checkup thread awakens). Each time test thread 168 awakens, it stores an identifier of the time it is scheduled (e.g., using the GetTickCount( ) system call of the "Windows CE" operating system). This identifier can be stored in a log or register of system 100 of FIG. 2 (e.g., in system memory 104 or nonvolatile memory 106).

Checkup thread 164 checks whether the test thread has been scheduled by scheduler 158 since the last time checkup thread 164 was awakened. If the test thread 168 has not been scheduled, then checkup thread 164 assumes that the reason a notification message has not been received by the process is due to some other process making substantial use of the processor and thereby preventing other processes from being scheduled.

Thus, if the test thread 168 has not been scheduled since the last time checkup thread 164 was awakened, checkup thread 164 determines in step 256 that failure to receive a notification message from the process within the specified amount of time (plus the buffer amount) does not indicate that the process has failed. However, if the test thread 168 has been scheduled since the last time checkup thread 164 was awakened, then checkup thread 164 determines in step 256 that failure to receive a notification message from the process within the specified amount of time (plus the buffer amount) does indicate that the process has failed.

If the selected process is determined to have failed in step 256, then checkup thread 164 sets a recovery event, via operating system 118, that will cause 18 recovery thread 170 to awaken (step 258). In step 258, checkup thread 164 also sets a flag or other indicator (if not already set by update thread 166) in running object list 148 that will be detected by recovery thread 170, as discussed in more detail below.

However, if the selected process is determined to be healthy in step 256, then checkup thread 164 proceeds to check whether there are any additional registered processes to check (step 260). If there are additional processes to check, then checkup thread 164 proceeds to select one of the processes (step 254) and determine whether it has failed (step 256). Steps 254–260 are repeated until all registered process have been checked.

Once all registered processes have been checked, checkup thread 164 proceeds to select a registered thread from registration database 144 of FIG. 2 (step 262). Checkup thread 164 then determines whether the selected thread has failed (step 264) and if so sets a recovery event that identifies the failed thread (step 266), analogous to steps 256 and 258 discussed above.

Checkup thread 164 then checks whether there are additional registered threads to check (step 268). If there are additional registered threads to check, then checkup thread 164 checks selects a thread and determines whether it has failed, repeating steps 262–268 until all registered threads have been checked. Once all registered threads have been checked, checkup thread 164 goes to sleep (step 270).

In the illustrated example of FIG. 5, only processes and threads are illustrated as being checked for failure. It is to be appreciated that the steps for selecting a registered process or thread, checking whether it has failed, and setting a recovery event if it has failed can be used analogously for any object to be monitored by CPM 134. Additionally, it is to be appreciated that checkup thread 164 can check whether objects have failed in a different order, such as first checking threads and then checking processes, or intermixing the checking of threads and processes.

Figure 6:
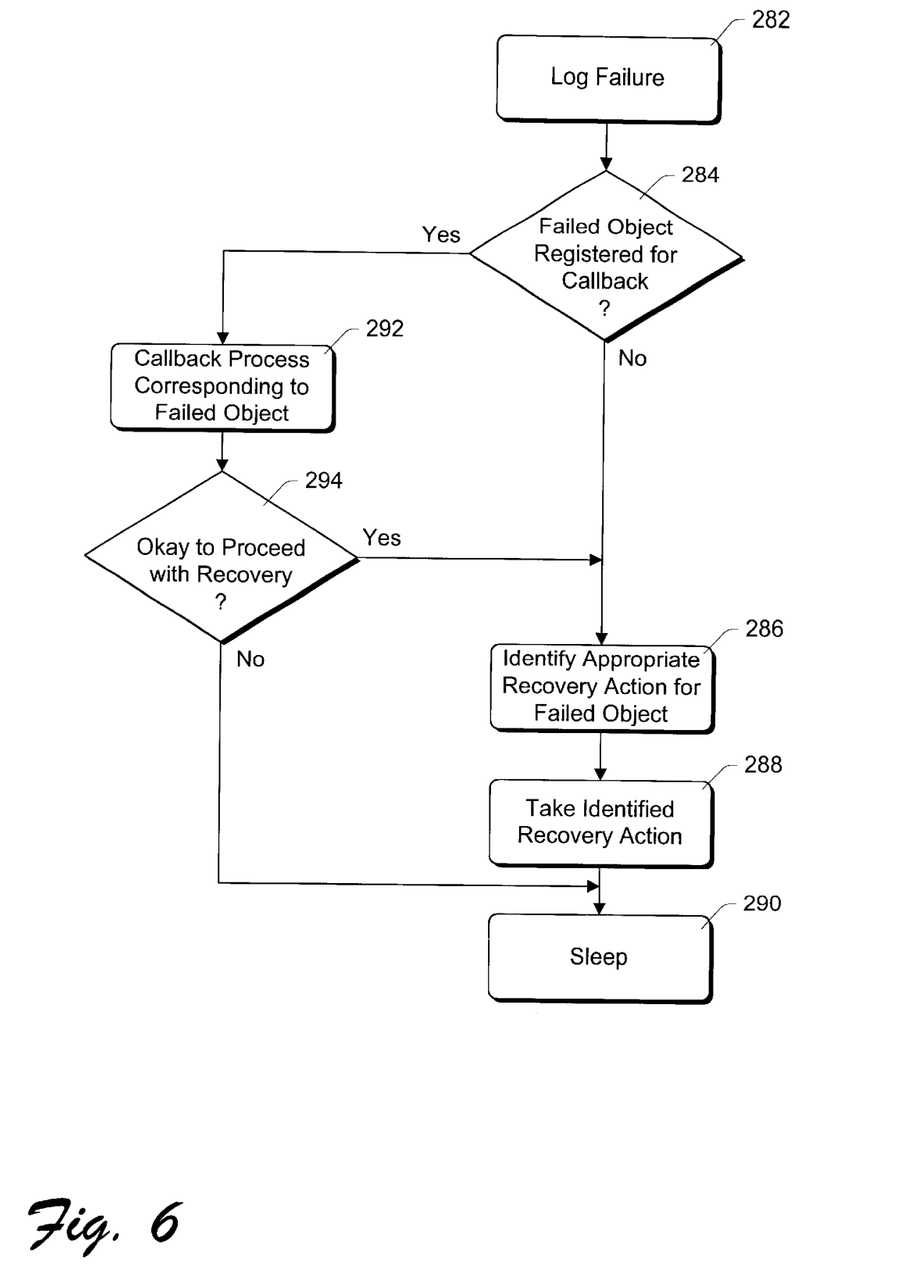
FIG. 6 is a flowchart illustrating exemplary steps of initiating a recovery action in response to a failed object in accordance with the invention.

FIG. 6 is a flowchart illustrating exemplary steps of initiating a recovery action in response to a failed object in accordance with the invention. The steps of FIG. 6 are implemented by recovery thread 170 of FIG. 2 and can be performed in software. FIG. 6 is described with additional reference to elements in FIGS. 2 and 3.

Recovery thread 170 is awakened in response to a recovery event having been set by checkup thread 164. Recovery thread 170 iterates through the running object list to determine which object(s) has failed. The steps of FIG. 6 are then carried out for each object that has failed.

Recovery thread 170 initially logs the failure (step 282). In the illustrated example, recovery thread 170 logs the time and date the failure was detected, as well as an indication (received from checkup thread 164 via the recovery event) of what the detected failure was.

Recovery thread 170 then checks registration database 144 to determine whether the failed object had registered for a callback (step 284). If the failed object has not registered for a callback, then recovery thread 170 identifies the appropriate recovery action for the failed object (step 286). The appropriate recovery action, as provided by the object when it registered (step 202 of FIG. 3), is obtained from registration database 144. Recovery thread 170 then takes the identified action, whatever it may be (step 288), then proceeds to go to sleep (step 290) until another recovery event is set by checkup thread 164.

Returning to step 284, if the failed object has registered for a callback, then the process corresponding to the failed object is called back (step 292). The appropriate process to call for the callback was identified by the object when it registered (step 202 of FIG. 3), and is obtained by recovery thread 170 from registration database 144.

Recovery thread 170 then checks whether it is okay to proceed with its recovery (step 294). If recovery thread 170 does not receive a response to its callback within a threshold amount of time (e.g., 500 msec), or receives a response indicating that it is okay to proceed with its recovery, then recovery thread 170 proceeds with its recovery by identifying the appropriate recovery action for the failed object (step 286), taking the identified action (step 288), and going to sleep (step 290). However, if a response to the callback indicates that it is not okay to proceed with the recovery, then recovery thread 170 aborts the recovery process and goes to sleep (step 290).

It should be noted that the callback in step 292 is carried out only if the process to be called has not terminated. If the process has terminated, then recovery thread 170 bypasses steps 292 and 294 and proceeds directly to step 286.

Exemplary Environment

Figure 7:
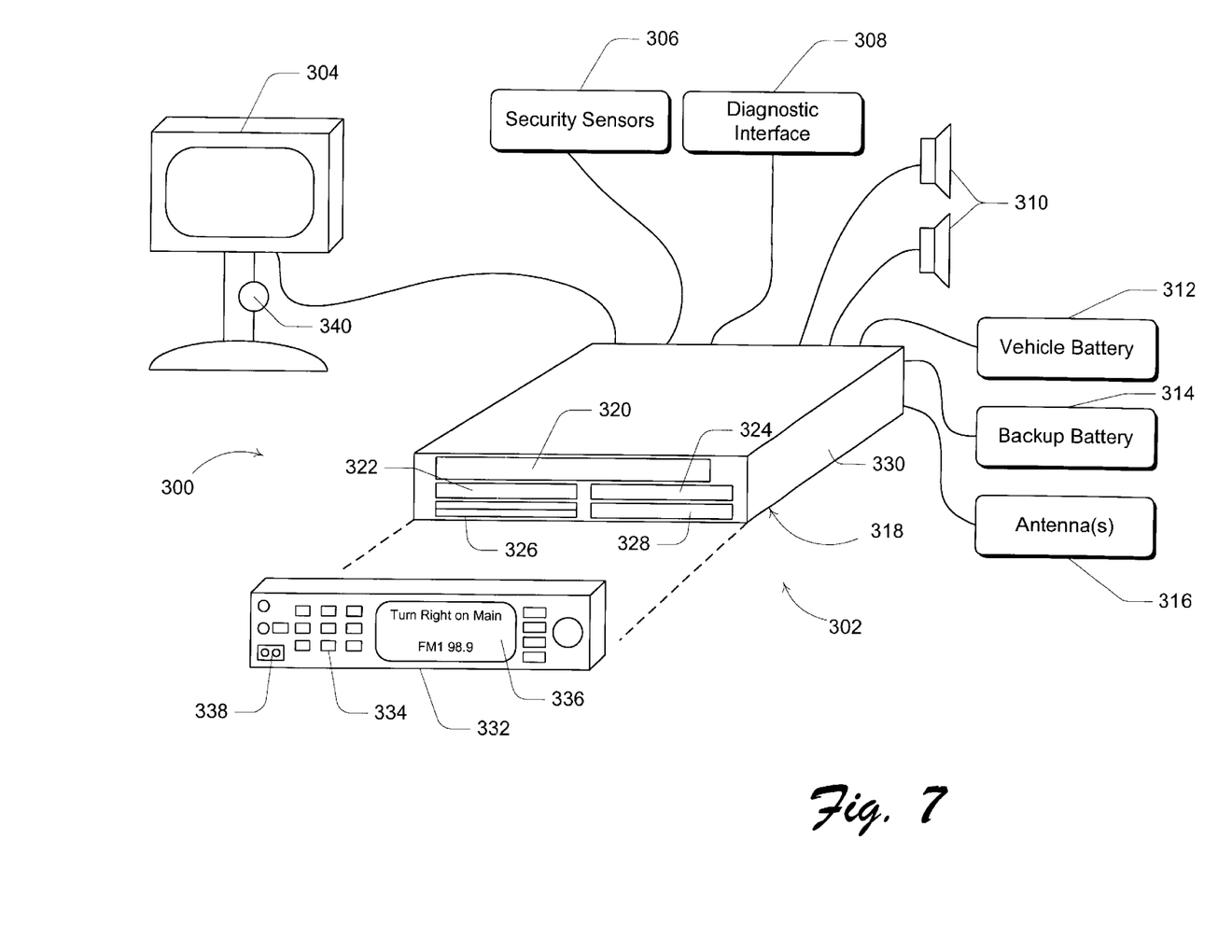
FIG. 7 shows an exemplary vehicle computer system such as may be used with the invention.

FIG. 7 shows an exemplary vehicle (e.g., automobile) computer system such as may be used with the invention. FIG. 7 shows a vehicle computer system 300, which can be computer 100 of FIG. 1. Vehicle computer system 300 has a centralized computer 302 coupled to various external peripheral devices, including a monitor 304, security sensors 306, a vehicle diagnostic interface 308, speakers 310, a vehicle battery 312, a backup battery 314, and antenna(s) 316. Computer 302 is assembled in a housing 318 that is sized to be mounted in a vehicle dashboard, similar to a conventional automobile stereo.

Computer 302 runs an open platform operating system which supports multiple applications. Using an open platform operating system and an open computer system architecture, various software applications and hardware peripherals can be produced by independent vendors and subsequently installed by the vehicle user after purchase of the vehicle. This is advantageous in that the software applications do not need to be specially configured for uniquely designed embedded systems.

Computer 302 includes at least one storage drive which permits the vehicle user to download programs and data from a storage medium. In the illustrated implementation, computer 302 has a CD ROM drive 320 which reads application-related CDs, as well as musical, video, game, or other types of entertainment CDs. In this manner, CD ROM drive 320 performs a dual role of storage drive and entertainment player. Computer 302 may also optionally include a 3.5" floppy diskette drive 322, a smart card reader 324, dual PCMCIA card sockets 326 which accept PCMCIA card types I, II and III, and a Compact Flash card (CF card) reader 328. Also, a hard disk drive (not shown) may optionally be included on computer 302 for storing application programs and/or user data. A DVD ("digital video disk" or "digital versatile disk") player may also be included in computer 302.

The storage drives are mounted in a base unit 330 of housing 318. Base unit 330 is constructed and sized to be mounted in the dashboard. Optionally, this base unit may be removable in the same fashion as a laptop computer and its associated docking station. This option allows the user to take the vehicle computer to his/her home or office to serve as his/her portable PC. Housing 318 also has a detachable faceplate 332 which is pivotally mounted to the front of base unit 330. The faceplate can be rotated to permit easy and convenient access to the storage drives.

Computer 302 has a keypad 334 (including a power off key) and a display 336 on faceplate 332. The operating system executing on computer 302 controls the faceplate peripheral, which through the faceplate processor, can control faceplate keys 334 and faceplate display 336 as peripheral devices when the faceplate is attached to the base unit. Additionally, computer 302 has a voice recognition device to permit the user to verbally enter commands in a hands-free, eyes-free environment. These voice commands can be used for controlling most operating modes of the vehicle computing platform. Computer 302 is also equipped with an IrDA (infrared developers association) transceiver port 338 mounted on faceplate 332 to transmit and receive data and programs using infrared signals. The entire faceplate unit 332 behaves as a multifunction peripheral to the computing platform.

Computer 302 can output visual data to LCD 336 at the faceplate, or to monitor 304. Display 336 is preferably a back lit LCD. In one implementation monitor 304 is a small flat panel display (e.g., 6.4" screen) that is movably mounted on a stand or yoke and remotely located from the computer. Monitor 304 is fully adjustable to different viewing positions that can be seen by the driver or other passengers in the vehicle. The type of data displayed on the monitor can range widely from word instructions concerning the vehicle's performance, to diagrammatic directions used by the navigation system, to video movies for in-car entertainment. Monitor 304 is equipped with an automatic override switch 340 which automatically disables the display of any non-driving related data when positioned to be viewed by the driver. When facing the driver, only information supportive and helpful to driving (e.g., diagnostics, navigation directions) is displayed on the monitor, while distracting information (e.g., video movies, games) is blocked from display. In one implementation, the switch is an electrical cylindrical switch which closes when the display is capable of being viewed by the driver; thus, the software can sense the display position and only allow permitted information to be displayed.

In general, vehicle computer system 300 can be used to integrate multiple vehicle-related systems onto one open platform hardware and software architecture. For instance, vehicle computer system 300 can serve as a multimedia entertainment system, a navigation system, a communications system, a security system, and a diagnostics system. Moreover, vehicle computer system 300 provides additional functionality traditionally associated with desk-top and lap-top personal computers. For instance, vehicle computer system 300 can support word processing applications, spreadsheet applications, database applications, and appointment/schedule applications. Furthermore, vehicle computer system 300 can be configured to operate as a server to other computing units in the vehicle to distribute games, video movies, and the like to passengers.

To load a new application or data into the system memory of computer 302, the vehicle user inserts a CD or other media into the appropriate drive and the operating system downloads the application or data therefrom. The installation process can be automatically handled by the operating system, or with the assistance of commands input from the user in the form of keyed sequences on keypad 334 or verbal instructions using the voice recognition device. Another technique to load data or applications or transfer data with other computing devices is through the use of IrDA transceiver port 338, or a wireless Internet link.

To add or update an application or data in the Flash memory of computer 302, the vehicle user inserts a CD or other media into the appropriate drive. The application or data is then copied to system memory of computer 302, and subsequently to the Flash memory, as described above.

Conclusion

The invention provides for monitoring of objects (e.g., processes, threads, and DLLs) in a computer system to improve the reliability of the system. Objects can advantageously be monitored using various techniques, some involving interaction between the object and a monitor and others occurring without such interaction (and possibly even without the object's knowledge). Additionally, when the monitoring determines that an object has failed, appropriate recovery action can advantageously be taken in order to restore the system to an operational state.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

---

CPM Registration
    The registration function is called by a thread within a process to register itself to the CPM.
    Syntax
    HANDLE CPMRegister (
              DWORD dwRegFlags,
              DWORD dwRecoverFlags,
              DWORD dwNotifyInterval = 0,
              WCHAR *pCommandLine = 0,
              HWND hwndCPMCallback = 0,
              PVOID pCallbackParm = 0,
              WCHAR *pLogComment = 0);
    Parameters
    dwRegFlags
        [in] Specifies the type of registration with CPM:
        CPM_REG_NONE = 0              Not registered
        CPM_REG_PROCESS_NOTIFY = 1  Process will notify on specific time quantum
        CPM_REG_PROCESS_WATCH = 2   Process will be watched to see if it goes away
        CPM_REG_THREAD_NOTIFY = 3   Thread will notify on specific time quantum
        CPM_REG_THREAD_WATCH = 4    Thread will be watched to see if it goes away
    dwRecoverFlags
        [in] Specifies what kind of actions the CPM should take to recover the process. It has the
        following flags:
        CPM_RECOVER_LOG = 1         Make a log entry only
        CPM_RECOVER_RELAUNCH = 2    Relaunch the process
        (Note That the following flags are for MS and OEM use only)
        CPM_RECOVER_REBOOT = 254     Initiate an immediate warm boot of the Auto PC
        CPM_RECOVER_REBOOT_DEFERRED= 255   Warm boot the Auto PC on the next
            power up cycle
    dwNotifyInterval (optional)
        [in] Specifies how often, in milliseconds, the application should notify the CPM that it is
        still functioning if it registered as dwRegFlags is set to either
        CPM_REG_PROCESS_NOTIFY or CPM_REG_THREAD_NOTIFY
    pCommandLine (optional)
        [in] Pointer to the command line Unicode string that launches the process if
        dwRecoverFlags is set to CPM_RECOVER_RELAUNCH.
    hwndCPMCallback (optional)
        [in] Handle to the thread to allow CPM to send it a message before taking corrective
        action.
    pCallbackParm (optional)
        [in] Registered object can supply a pointer to be returned on the callback.
    pLogComment (optional)
        [in] Registered object can supply a comment for the log; usually used with threads to
        provide some identification.
    Return Values
    A valid handle indicates success. INVALID_HANDLE_VALUE indicates failure. This
    returned handle is used by subsequent calls of the process or thread to the CPM.
    Remarks
    Only processes and threads that are essential for the proper operation of the Auto PC should
    call this function. Each process and thread should only register once.
CPM Notify
    Syntax
    BOOL CPMNotify (HANDLE hCPM);
    Parameters
    hCPM
        [in] Specifies the handle returned by CPMRegister.
    Return Values
    TRUE indicates success. FALSE indicates that the registration has been lost. This should
    only happen when a registered thread or process fails. In that case, that thread or process is
    automatically deregistered even though it was not restarted. This could also be caused if the
    process or thread had unregistered and then still made this call.
    Remarks
    CPMNotify must be called by the thread at a rate at least as frequent as the notification
    interval that was registered with CPMRegister. If the CPM does not receive a notification
    within the registered time limit, it assumes that the thread has encountered a fault condition
    and takes appropriate action, according to the monitor option that the process registered.

-continued

CPM Unregister
    Notifies the CPM that the thread will no longer need to be monitored either by a timer or just by presence. This should be done by the thread before it exits itself to prevent confusion.
    Syntax
    void CPMUnRegister (HANDLE hCPM);
    Parameters
    hCPM
        [in] Specifies the handle returned by CPMRegister.
    Return Values
    None
    Remarks
    A thread or process that registers with the CPM by calling CPMRegister should call CPMUnRegister when the thread is no longer critical to the proper operation of the Auto PC.
Callback Message WM_APCSYSMSG_CPM
    Once CPM has detected a problem, it sends a callback message to the problem process/thread using the SendMessage API call. This allows the process/thread to release memory allocations.
    Syntax
        WM_APCSYSMSG_CPM wParam = failure code; lParam = callback pointer
    Parameters
    wParam – failure code indicates what CPM believes is the problem
    lParam – pointer sent by the registered app to be returned in case of callback
    Return Value
    Boolean returned. TRUE indicates that recovery should be stopped. FALSE, continue with recovery of failed process/thread
    Remarks
    Depending on the error condition, the process/thread can recover memory and resume operations or prepare to closed by the CPM.
    The thread's message function returns a Boolean value to signal to the CPM if it should continue the recovery process. If the thread determined that it is healthy, (but perhaps just missed a timer notification) then it can prevent further corrective action by the CPM. After the callback is completed and the thread has signaled to continue the recovery process, then the CPM may initiate one of the following corrective actions to restart the process. The choice of which correction to take is made by the process or thread when it registered itself with the CPM.

What is claimed is:

1. A system comprising:
   a bus;
   a processor coupled to the bus; and
   a memory, coupled to the bus, including a plurality of instructions to be executed by the processor, the plurality of instructions including,
      an object to generate a registration request, including a registration type identifying a way failure of the object is to be determined and a recovery type identifying a recovery action to initiate in the event failure of the object is detected, and
      a monitor to receive the registration request, to monitor the object for failure in accordance with the registration type, and if failure of the object is detected then to initiate the recovery action in accordance with the recovery type.

2. A system as recited in claim 1, wherein the system comprises an automobile computer.

3. A system as recited in claim 1, further comprising a registration database, coupled to the monitor, to store registration requests from a plurality of objects.

4. A system as recited in claim 1, wherein the object is further to generate notification messages and repeatedly send the notification messages to the monitor within a specified amount of time after the previous notification message was sent.

5. A system as recited in claim 4, further comprising a notification log, coupled to the monitor, to store a record of the notification messages.

6. A system as recited in claim 1, wherein the monitor is to detect a failure of the object if a notification message is not received from the object within a specified amount of time after a previous notification message was received.

7. A system as recited in claim 1, wherein the monitor is to detect a failure if the object is no longer executing in the system.

8. A method in a system, the method comprising:
   receiving a registration request from an object, the registration request including an indication of a way failure of the object is to be determined and a type of recovery to be attempted in the event of a detected failure of the object;
   detecting, in accordance with the indication of the way failure of the object is to be determined, whether the object has failed; and
   initiating recovery of the object in accordance with the indication of the type of recovery to be attempted in response to detecting that the object has failed.

9. A method as recited in claim 8, wherein the object comprises an application process.

10. A method as recited in claim 8, wherein the object comprises an application thread.

11. A method as recited in claim 8, wherein the detecting comprises detecting the object has failed if a notification is not received from the object within a specified amount of time.

12. A method as recited in claim 11, wherein the specified amount of time comprises an amount of time provided by the object plus an additional buffer amount of time.

13. A method as recited in claim 11, wherein:
   the receiving comprises receiving the registration request from a first thread associated with the object;
   the detecting comprises detecting the object has failed if a notification is not received from a second thread associated within the object within the specified amount of time; and
   the second thread is different from the first thread.

14. A method as recited in claim 8, wherein the detecting comprises:
repeatedly checking whether the object is still running in the system; and
determining the object has failed if the object is no longer present running in the system.

15. A method as recited in claim 8, wherein the initiating recovery of the object comprises logging the detected failure.

16. A method as recited in claim 8, wherein the initiating recovery of the object comprises terminating the object and restarting the object.

17. A method as recited in claim 16, wherein the restarting the object comprises restarting a process corresponding to the object.

18. A method as recited in claim 16, wherein the registration request further includes a command line, and wherein the restarting the object comprises executing the command line.

19. A method as recited in claim 8, wherein the initiating recovery of the object comprises rebooting the system.

20. A method as recited in claim 8, wherein the initiating recovery of the object comprises rebooting the system after a subsequent event occurs.

21. A method as recited in claim 20, wherein the subsequent event comprises an ignition coupled to the system being turned off.

22. A method as recited in claim 20, wherein the subsequent event comprises activation of a power off button.

23. A method as recited in claim 8, further comprising sending, prior to the initiating recovery of the object, a message to the object to verify that the object is to be recovered.

24. A method as recited in claim 23, further comprising aborting the recovery in response to an indication being received from the object that the object is not to be recovered.

25. At least one computer-readable memory containing a computer program that is executable by a processor to perform the method recited in claim 8.

26. An automobile computer programmed to perform the method as recited in claim 8.

27. A method in an object, the method comprising
generating a registration request, the registration request including an indication of a way failure of the object is to be determined and a type of recovery to be attempted in the event of a detected failure of the object; and
transmitting the registration request to a monitor.

28. A method as recited in claim 27, wherein the object comprises an application process.

29. A method as recited in claim 27, wherein the object comprises an application thread.

30. A method as recited in claim 27, further comprising:
receiving an indication from the monitor that the object was detected as having failed; and
providing a response to the monitor indicating whether recovery of the object is refused.

31. A method as recited in claim 27, further comprising generating notification messages and repeatedly sending the notification messages to the monitor within a specified amount of time after the previous notification message was sent.

32. At least one computer-readable memory containing a computer program that is executable by a processor to perform the method recited in claim 27.

33. A system comprising:
a plurality of objects running in the system; and
a monitor to,
monitor the plurality of objects,
detect when at least one of the plurality of objects has failed, and
initiate an appropriate recovery action when an object fails, wherein a type of the recovery action is previously identified by the object.

34. A system as recited in claim 33, wherein the monitor is to passively monitor the plurality of objects.

35. A system comprising:
a plurality of objects running in the system; and
a monitor to,
passively monitor the plurality of objects by repeatedly comparing a list of currently running objects to a list of objects that should be running,
detect when at least one of the plurality of objects has failed, and
initiate an appropriate recovery action when an object fails.

36. A system as recited in claim 34, wherein the monitor is to passively monitor the plurality of objects by repeatedly comparing an initial heap allocation for the object and a current heap allocation for the object.

37. A system as recited in claim 33, wherein the monitor is to actively monitor the plurality of objects.

38. A system as recited in claim 37, wherein the monitor is to actively monitor the plurality of objects by repeatedly receiving feedback from at least one of the plurality of objects running in the system.

39. A system as recited in claim 33, wherein at least one of the plurality of objects comprises a process.

40. A system as recited in claim 33, wherein at least one of the plurality of objects comprises a thread.

41. At least one computer-readable memory containing a computer program that is executable by a processor to perform the method recited in claim 33.

42. A system as recited in claim 33, implemented in an automobile computer.

43. A method comprising:
determining that an object in a system has failed in response to not receiving a notification from the object within a specified amount of time;
checking whether a test object is being scheduled to execute by a system scheduler; and
initiating recovery of the object if the test object is being scheduled, otherwise reversing the determination that the object has failed if the test object is not being scheduled.

44. A method as recited in claim 43, wherein the test object comprises a test thread.

45. A method as recited in claim 43, wherein the checking comprises comparing an interval at which the test object should be executed to a difference between a current time and a last time that the test object was scheduled to execute.

46. At least one computer-readable memory containing a computer program that is executable by a processor to perform the method recited in claim 43.

47. An automobile computer programmed to perform the method as recited in claim 43.

48. A computer-readable storage medium comprising computer-executable instructions that implement interface methods, the interface methods performing a function comprising:
recording a way failure of an object is to be determined and a type of recovery to be attempted in the event of a detected failure of the object, wherein the way failure of the object is to be determined is identified by the object.

49. A computer-readable storage medium of claim 48, the interface methods further performing a function comprising removing, from a database, the way failure of the object is to be determined and the type of recovery to be attempted.

50. A computer-readable storage medium of claim 48, the interface methods further performing a function comprising updating a notification log with a new notification time for the object.

51. A computer-readable storage medium of claim 48, wherein the type of recovery to be attempted is identified by the object.

52. A computer-readable storage medium comprising computer-executable instructions that implement interface methods, the interface methods performing a function comprising:

recording a way failure of an object is to be determined and a type of recovery to be attempted in the event of a detected failure of the object; and further performing a function comprising informing the object that a recovery process has been initiated for the object and providing the object with an opportunity to abort the recovery process.

53. A method comprising:

recording a way failure of an object is to be determined and a type of recovery to be attempted in the event of a detected failure of the object, wherein the type of recovery to be attempted is identified by the object.

54. A method as recited in claim 53, wherein the object comprises an application process.

55. A method as recited in claim 53, wherein the object comprises an application thread.

56. A method as recited in claim 53, wherein the way failure of the object is to be determined is identified by the object.

57. A system comprising:

a database; and a monitor configured to record, in the database, a way failure of an object is to be determined and a type of recovery to be attempted in the event of a detected failure of the object, wherein the way failure of the object is to be determined and the type of recovery to be attempted are both identified by the object.

58. A system as recited in claim 57, wherein the object comprises an application process.

59. A system as recited in claim 57, wherein the object comprises an application thread.

60. A system comprising:

a processor;

a memory, coupled to the processor, including a plurality of instructions to be executed by the processor, the plurality of instructions including, a monitor to determine that an object in a system has failed in response to not receiving a notification from the object within a specified amount of time, to check whether a test object is being scheduled to execute by a system scheduler, to initiate recovery of the object if the test object is being scheduled, and to reverse the determination that the object has failed if the test object is not being scheduled.

61. A system as recited in claim 60, wherein the test object comprises a test thread.

62. A system as recited in claim 60, wherein the instructions to check whether the test object is being scheduled to execute by the system scheduler comprises instructions to compare an interval at which the test object should be executed to a difference between a current time and a last time that the test object was scheduled to execute.

63. A system as recited in claim 62, wherein the system comprises an automobile computer.

* * * * *

UNITED STATES PATENT AND TRADEMARK OFFICE
CERTIFICATE OF CORRECTION

PATENT NO. : 6,594,774 B1
DATED : July 15, 2003
INVENTOR(S) : Chapman et al.

It is certified that error appears in the above-identified patent and that said Letters Patent is hereby corrected as shown below:

<u>Column 6,</u>
Line 12, delete "o" between "be" and "running".

<u>Column 11,</u>
Line 65, delete "18" between "cause" and "recovery".

<u>Column 22,</u>
Line 35, replace number "62" with number -- 60 --.

Signed and Sealed this

Seventeenth Day of February, 2004

JON W. DUDAS
*Acting Director of the United States Patent and Trademark Office*